United States Patent
Chokshi et al.

(10) Patent No.: US 8,166,764 B2
(45) Date of Patent: *May 1, 2012

(54) FLOW SLEEVE IMPINGEMENT COOLING USING A PLENUM RING

(75) Inventors: Jaisukhlal V. Chokshi, Palm Beach Gardens, FL (US); Craig F. Smith, Ashford, CT (US); Carlos G. Figueroa, Wellington, FL (US)

(73) Assignee: United Technologies Corporation, Hartford, CT (US)

( * ) Notice: Subject to any disclaimer, the term of this patent is extended or adjusted under 35 U.S.C. 154(b) by 815 days.

This patent is subject to a terminal disclaimer.

(21) Appl. No.: 12/176,895

(22) Filed: Jul. 21, 2008

(65) Prior Publication Data

US 2010/0031665 A1    Feb. 11, 2010

(51) Int. Cl.
*F02C 1/00*    (2006.01)

(52) U.S. Cl. ............... 60/772; 60/758; 60/760

(58) Field of Classification Search ............ 60/752, 60/754, 755, 756, 757, 758, 759, 760, 772, 60/804, 39.23
See application file for complete search history.

(56) References Cited

U.S. PATENT DOCUMENTS

| | | | |
|---|---|---|---|
| 4,339,925 A | 7/1982 | Eggmann et al. | |
| 5,363,654 A | 11/1994 | Lee | |
| 5,388,412 A | 2/1995 | Schulte-Werning et al. | |
| 5,467,815 A | 11/1995 | Haumann et al. | |
| 5,533,864 A | 7/1996 | Nomoto et al. | |
| 5,586,866 A | 12/1996 | Wettstein | |
| 5,782,294 A | 7/1998 | Froemming et al. | |
| 6,000,908 A | 12/1999 | Bunker | |
| 6,029,455 A * | 2/2000 | Sandelis | 60/752 |
| 6,484,505 B1 | 11/2002 | Brown et al. | |
| 6,701,714 B2 | 3/2004 | Burd et al. | |
| 6,810,673 B2 | 11/2004 | Snyder | |
| 6,837,053 B2 | 1/2005 | Tiemann | |
| 6,925,808 B2 * | 8/2005 | Tiemann | 60/722 |
| 7,270,175 B2 | 9/2007 | Mayer et al. | |

\* cited by examiner

*Primary Examiner* — Ehud Gartenberg
*Assistant Examiner* — Arun Goyal
(74) *Attorney, Agent, or Firm* — Kinney & Lange, P.A.

(57) ABSTRACT

A combustor assembly for a turbine engine includes a combustor liner, a flow sleeve and a plenum ring. The flow sleeve surrounds the combustor liner to form an annulus radially between the combustor liner and the flow sleeve. The flow sleeve has a plurality of rows of cooling holes. The plenum ring radially surrounds the combustor liner in the annulus. The plenum ring has a plurality of bypass tubes for directing axial air flow and radial flow chambers for directing radial air flow.

19 Claims, 7 Drawing Sheets

FLOW SLEEVE IMPINGEMENT COOLING USING A PLENUM RING

BACKGROUND

The present invention relates to a combustor assembly of a gas turbine engine. More specifically, the present invention relates to an apparatus and method of cooling a combustor liner of a gas turbine engine.

A gas turbine engine extracts energy from a flow of hot combustion gases. Compressed air is mixed with fuel in a combustor assembly of the gas turbine engine, and the mixture is ignited to produce hot combustion gases. The hot gases flow through the combustor assembly and into a turbine where energy is extracted.

Conventional gas turbine engines use a plurality of combustor assemblies. Each combustor assembly includes a fuel injection system, a combustor liner and a transition duct. Combustion occurs in the combustion liner. Hot combustion gases flow through the combustor liner and the transition duct into the turbine.

The combustor liner, transition duct and other components of the gas turbine engine are subject to these hot combustion gases. Current design criteria require that the combustor liner be cooled to keep its temperature within design parameters. One cooling technique is impingement cooling a surface wall of the combustor liner.

In impingement cooling of a combustor liner, a jet-like flow of cooling air is directed towards the backside wall (outer surface) of the liner, where the front side (inner surface) of the liner is exposed to the hot gases. After impingement, the "spent air" (i.e. air after impingement) flows generally parallel to the combustor liner.

Gas turbine engines may use impingement cooling to cool combustor liners and transition ducts. In such arrangements, the combustor liner is surrounded by a flow sleeve, and the transition duct is surrounded by an impingement sleeve. The flow sleeve and the impingement sleeve are each formed with a plurality of rows of cooling holes.

A first flow annulus is created between the flow sleeve and the combustor liner. The cooling holes in the flow sleeve direct cooling air jets into the first flow annulus to cool the combustor liner. After impingement, the spent air flows axially through the first flow annulus in a direction generally parallel to the combustor liner.

A second flow annulus is created between the transition duct and the impingement sleeve. The holes in the impingement sleeve direct cooling air into the second flow annulus to cool the transition duct. After impingement, the spent air flows axially through the second flow annulus, in a direction generally parallel to the transition duct.

The combustor liner and the transition duct connect, and the flow sleeve and the impingement sleeve connect, such that the first flow annulus and the second flow annulus create a continuous flow path. That is, spent air from the second flow annulus continues into the first flow annulus. This flow from the second flow annulus may reduce the effectiveness and efficiency of the cooling air jets of the flow sleeve. For example, flow through the second flow annulus may bend the jets entering through the flow sleeve, reducing the heat transferring effectiveness of the jets or completely preventing the jets from reaching the surface of the combustor liner. This is especially a problem with regard to the first row of flow sleeve cooling holes adjacent the impingement sleeve.

BRIEF SUMMARY OF THE INVENTION

A combustor assembly for a turbine engine includes a combustor liner, a flow sleeve and a plenum ring. The flow sleeve surrounds the combustor liner to form an annulus radially between the combustor liner and the flow sleeve. The flow sleeve has a plurality of rows of cooling holes.

The plenum ring radially surrounds the combustor liner in the annulus. The plenum ring has a plurality of bypass tubes for directing axial air flow, and radial flow chambers for directing radial air flow. The plenum ring may be added to a new or existing gas turbine assembly to provide efficient cooling air flow to the combustor liner and improve impingement cooling. Compared to other impingement assemblies, the plenum ring has a reduced part-count, lower cost, and a reduced potential for foreign object damage in the combustor assembly.

DETAILED DESCRIPTION

Figure 1:
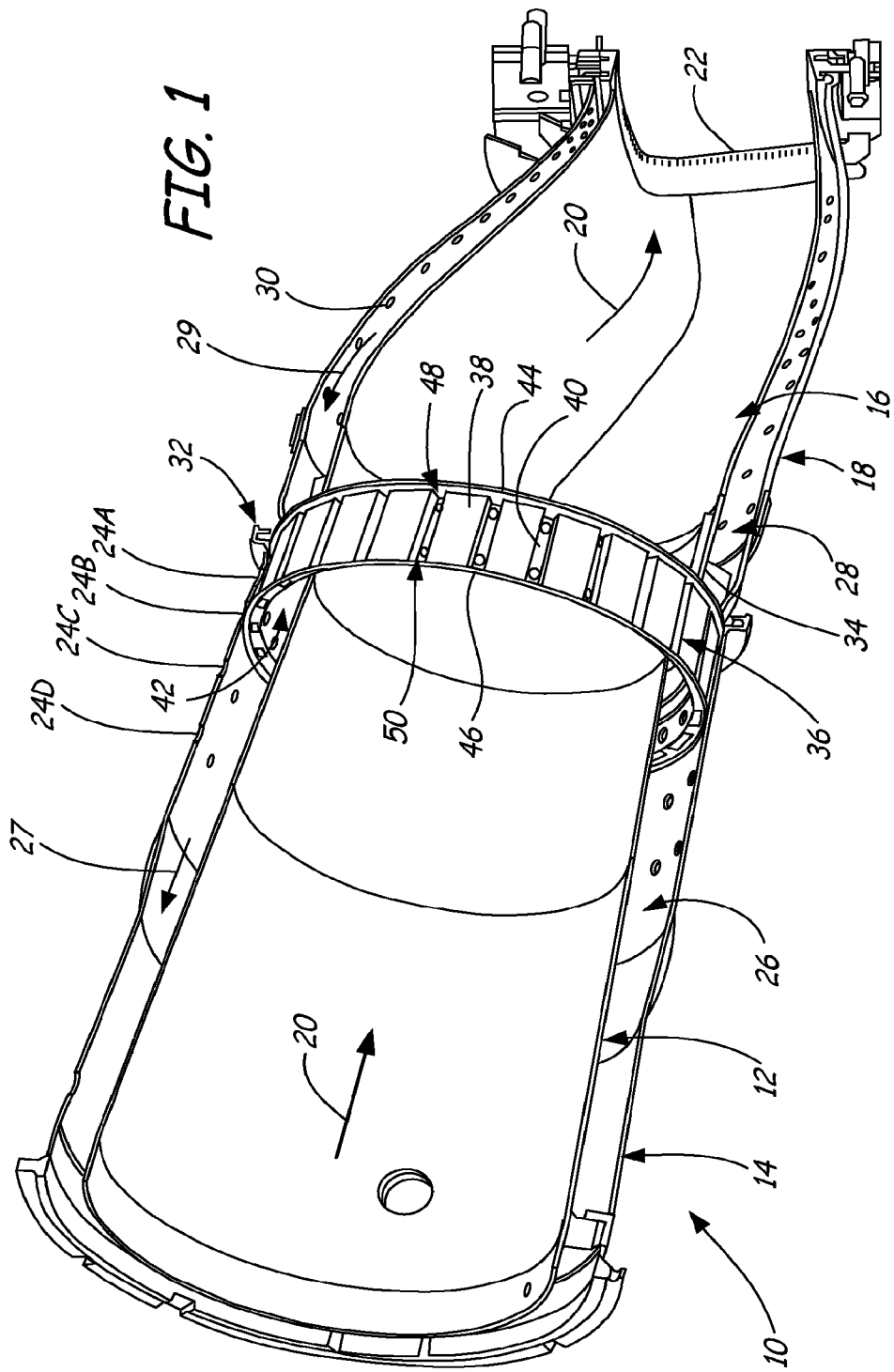
FIG. 1 is a cross section a combustor assembly with a plenum ring.

FIG. 1 shows combustor assembly 10 having a combustor liner 12, flow sleeve 14, transition duct 16, impingement sleeve 18 and plenum ring 36. Combustor liner 12 connects to transition duct 16. In use, hot gases, indicated by arrows 20, flows through combustor liner 12, into transition duct 16 and exit combustor assembly 10 through exit 22 to a turbine.

Flow sleeve 14 surrounds combustor liner 12 and is formed with a plurality of rows of cooling holes 24A, 24B, 24C, 24D (referred to generally as cooling holes 24). First flow annulus 26 is formed between combustor liner 12 and flow sleeve 14. Cooling air enters as jet-like flow into first flow annulus 26 through cooling holes 24, and impinges upon combustor liner 12 to cool it. After impingement, the spent cooling air flows generally parallel to combustor liner 12 in first flow annulus 26. The flow of spent cooling air through first flow annulus 26 is indicated by arrow 27.

Impingement sleeve 18 surrounds transition duct 16. Second flow annulus 28 is formed between transition duct 16 and impingement sleeve 18. Impingement sleeve 18 is formed with a plurality of rows of cooling holes 30. Similar to the impingement of combustor liner 12, cooling air enters second flow annulus 28 through cooling holes 30 and impinges upon transition duct 16 to cool it. After impingement, the spent cooling air flows generally parallel to transition duct 16 in second flow annulus 28. The flow of spent cooling air through second flow annulus 28 is indicated by arrow 29.

Combustor liner 12 and transition duct 16 connect at a sliding seal 34. Flow sleeve 14 and impingement sleeve 18 are connected at sliding joint and piston (seal) ring 32. First flow annulus 26 and second flow annulus 28 form a continuous flow path, so that after impingement on transition duct 16, spent cooling air from second flow annulus 28 continues downstream into first flow annulus 26.

The flow of spent cooling air 27, 29 is opposite the flow of hot gases 20 through combustor liner 12. Therefore, the terms "upstream" and "downstream" depend on which flow of air is referenced. In this application, the terms "upstream" and "downstream" are with respect to the flow of spent cooling air 27, 29.

Plenum ring 36 surrounds a portion of combustor liner 12. Plenum ring 36 is located in first flow annulus 26 and fits against flow sleeve 14. Plenum ring 36 may be attached to flow sleeve 14 by mechanical fastening means. In one example, rivets attach plenum ring 36 to flow sleeve 14. In another example, plenum ring 36 is welded to flow sleeve 14.

Plenum ring 36 has bypass tubes or passages 38, radial flow chambers or passages 40, inner ring 42, upstream flange 44 and downstream flange 46. Upstream flange 44 and downstream flange 46 define upstream end 48 and downstream end 50 of plenum ring 36 respectively. Inner ring 42 is disposed co-axially with and radially spaced inward from upstream flange 44 and downstream flange 46 about a centerline axis. In use, inner ring 42 extends towards but does not engage combustor liner 12. That is, air in first flow annulus 26 may flow between inner ring 42 and combustor liner 12.

Figure 2A:
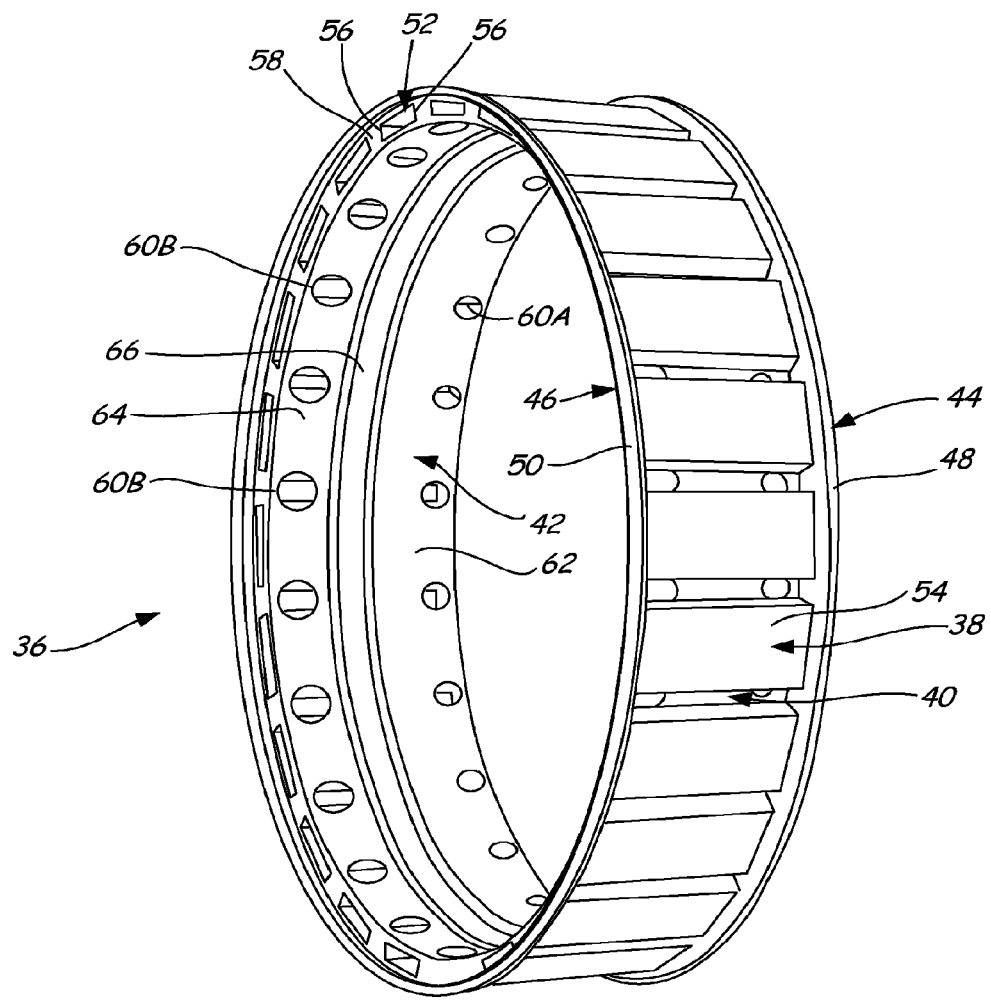
FIG. 2A is a perspective view of the plenum ring.
Figure 2B:
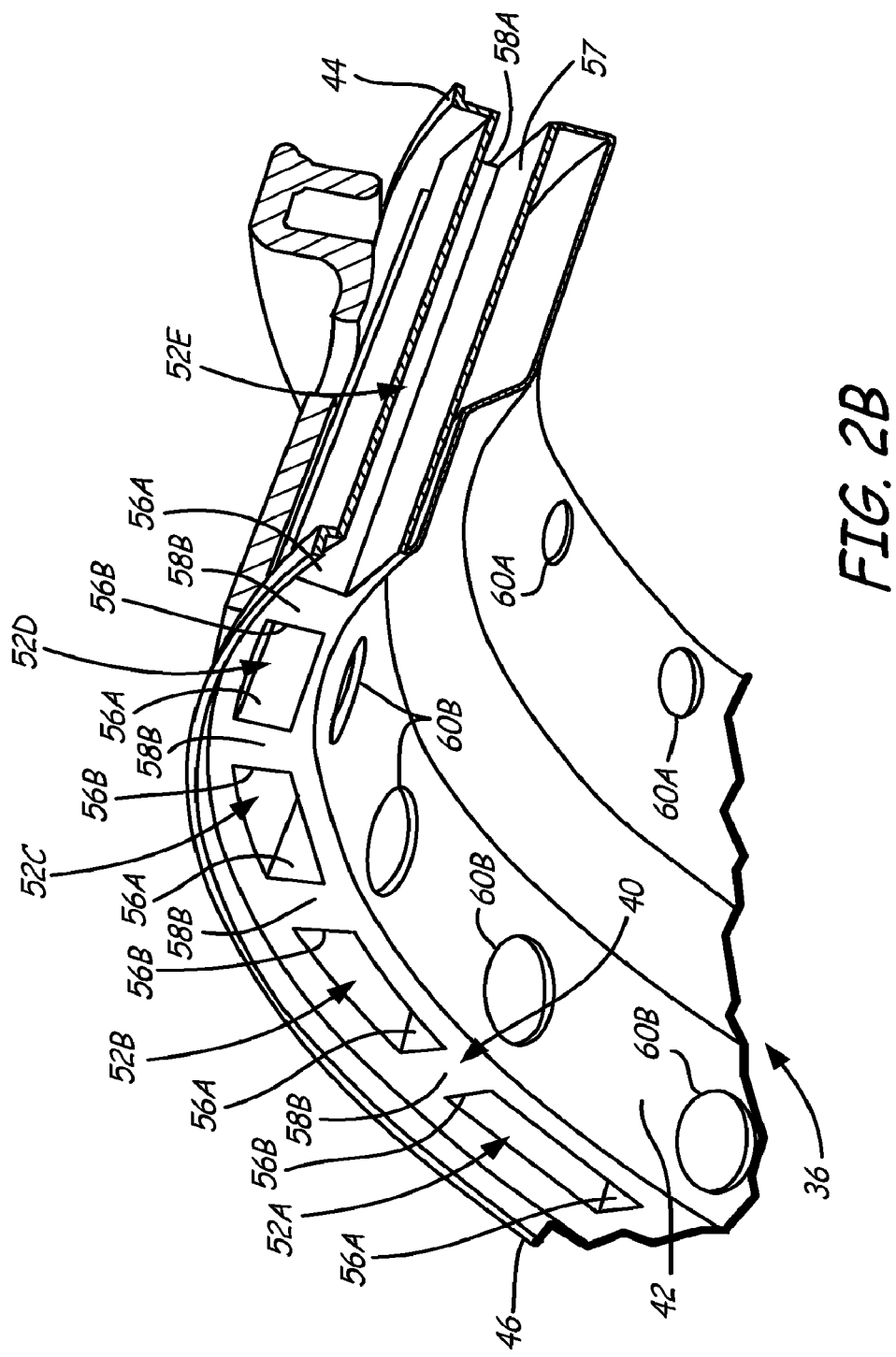
FIG. 2B is an enlarged perspective view of the plenum ring.

FIG. 2A shows a perspective view of plenum ring 36 and FIG. 2B shows an enlarged view of plenum ring 36. Bypass tubes 38 and radial flow chambers 40 are arranged in an alternating pattern around plenum ring 36. Bypass tubes 38 and radial flow chambers 40 extend axially from upstream flange 44 to downstream flange 46. In one example, bypass tubes 38 and radial flow chambers 40 axially extend about 3.5 inches (8.9 cm).

Each bypass tube 38 has bypass channel 52 defined by top wall 54 and a pair of side walls 56. Top wall 54 is spaced apart from inner ring 42. Side walls 56 are generally parallel to and spaced apart from each other. Side walls 56 are generally perpendicular to top wall 54 and to inner ring 42, so that air can flow through bypass channel 52.

Each bypass tube 38 includes bottom wall 57, which is parallel to and spaced apart from top wall 54. Bottom wall 57 forms a level bottom in bypass channel 52 if inner ring 42 does not have a uniform diameter as will be explained later. In one example, side walls 56 attach to bottom wall 57 and top wall 54 to define bypass channel 52. The upstream end 48 and downstream end 50 of each bypass tube 38 are open and create an axial fluid flow channel so that air may flow axially through bypass channels 52, in a direction parallel to combustion liner 12.

Radial flow chambers 40 have end walls 58A, 58B and inner ring 42. Radial flow chambers 40 are arranged alternatively with bypass tubes 38 so that the sides of radial flow chambers 40 are defined by side walls 56. For example, as seen in FIG. 2B sidewall 56B of bypass channel 52A and sidewall 56A of bypass channel 52B form the sides of one radial flow chamber 40. Inner ring 42 forms the bottom of each radial flow chamber 40.

End walls 58A, 58B are axial flow blockers. End walls 58B extend from inner ring 42 to upstream flange 44 at upstream end 48, and end walls 58A extend from inner ring 42 to downstream flange 46 at downstream end 50. End walls 58A, 58B also extend from side walls 56A, 56B that form the respective radial flow chamber 40. End walls 58A, 58B prevent air flowing parallel to combustor liner 12 and in first flow annulus 26 from entering radial flow chambers 40. End walls 58A, 58B reduce the cross flow affects on the cooling air jets entering through flow sleeve 14.

At least one flow hole 60A, 60B (referred to collectively as flow holes 60) is formed in inner ring 42 of each radial flow chamber 40. When plenum ring 36 is in place, radial flow chambers 40 align with cooling holes 24 in flow sleeve 14 so that in use, air flows through cooling holes 24 into radial flow chambers 40, and exits through flow holes 60.

In one example, two flow holes, flow hole 60A and flow hole 60B, are formed in inner ring 42 of each radial flow chamber 40. Flow hole 60A and flow hole 60B may have the same or different diameters. The diameters of flow holes 60A, 60B depend upon the desired cooling flow rate. In one example, flow hole 60A has a smaller diameter than 60B. In another example, flow hole 60B has a diameter about 45% larger than flow hole 60A. In another example, flow hole 60A has a diameter of about 0.52 inches (1.3 cm) and flow hole 60B has a diameter of about 0.75 inches (1.9 cm).

Flow hole 60A and flow hole 60B may be aligned with a first row of cooling holes 24A adjacent impingement sleeve 18 and a second row of cooling holes 24B respectively. Flow holes 60A, 60B may have the same diameters as cooling holes 24A, 24B with which they are aligned. Alternatively, flow holes 60A, 60B may have smaller diameters than cooling holes 24A, 24B with which they are aligned, so that flow holes 60A, 60B meter the amount of cooling air introduced into first flow annulus 26.

Radial flow chamber 40 creates a flow channel perpendicular (or radial) to combustor liner 12. Cooling air jets flow perpendicular to combustor liner 12 through flow sleeve 14 and radial flow chambers 40 to impinge on combustor liner 12. End walls 58 block axial air flow into radial flow chamber 40, reducing the cross flow effects on the cooling air jets flowing through radial flow chambers 40.

The space between side walls 56 determines the width of bypass tubes 38 and radial flow chambers 40. Side walls 56 should be arranged so that bypass tubes 38 are wider than radial flow chambers 40. This minimizes the area blocked by radial flow chambers 40, and prevents a pressure drop in annulus 26 and annulus 28. In one example, side walls 56 are placed immediately adjacent flow holes 60 so that the width of bypass tubes 38 is maximized and the width of radial flow chambers 40 is minimized on a given plenum ring 36.

Inner ring 42 may be comprised of three sections: upstream section 62, downstream section 64 and transition section 66. Transition section 66 connects upstream section 62 and downstream section 64. Sections 62, 64, 66 may be the same length or may be different lengths. In one example, upstream section 62 is longer than downstream section 64, and downstream section 64 is longer than transition section 66. Section 62 and section 64 may have the same or different diameters. In another example, section 62 and section 64 have different diameters and transition section 66 is at about a 30 degree angle to upstream section 62. In another example, downstream section 64 has a diameter about 60% larger than upstream section 62.

When section 62 and section 64 have different diameters, upstream section 62 and downstream section 64 are different distances from combustor liner 12. In one example, upstream section 62 is closer to combustor liner 12 than downstream section 64. In another example, upstream section 62 is about 50% closer to the combustor liner than downstream section 64.

Additionally, when section 62 and section 64 have different diameters, each radial flow chamber 40 has a varying or non-uniform depth. The depth of radial flow chamber 40 at upstream end 48 is measured radially from upstream flange 44 to inner ring 42 of upstream section 62. The depth of radial flow chamber 40 at downstream end 50 is measured radially from downstream flange 46 to inner ring 42 of downstream section 64. In one example, radial flow chamber 40 is deeper at upstream end 48 than at downstream end 50.

As discussed above, bottom wall 57 may form a level bottom in channel 52 when section 62 and section 64 have different diameters. As seen in FIG. 2B, when bottom wall 57 is in place, air may flow between inner ring 42 and bottom wall 57.

Flow holes 60 may be formed in upstream section 62 and downstream section 64. Flow hole 60A may be formed in upstream section 62 and flow hole 60B may be formed downstream section 64. As described above, flow hole 60A and flow hole 60B may have different diameters. In one example, flow hole 60A has a smaller diameter than flow hole 60B.

When upstream section 62 is closer to combustor liner 12 than downstream section 64, upstream section 62 blocks the cross flow from second flow annulus 28 for downstream section 64. In this case, the cooling air jet flowing through flow hole 60B is not effected as much by the cross flow as the cooling air jet flowing through flow hole 60A, and it is not necessary for downstream section 64 to be as close to combustor liner 12.

Upstream flange 44 and downstream flange 46 have a larger outer diameter than the cylinder formed by top walls 54. That is, upstream flange 44 and downstream flange 46 extend above top walls 54 so that when plenum ring 36 is in place, upstream flange 44 and downstream flange 46 are in contact with flow sleeve 14 while top wall 54 is not. In one example, upstream flange 44 and downstream flange 46 have an outer diameter of about 17.9 inches (45.5 cm).

As described above, plenum ring 36 may attach to the inner surface of flow sleeve 14 with mechanical fastening means. In one example, rivets are used to attach upstream flange 44 and downstream flange 46 to flow sleeve 14. In another example, upstream flange 44 and downstream flange 46 are welded to flow sleeve 14.

Figure 3A:
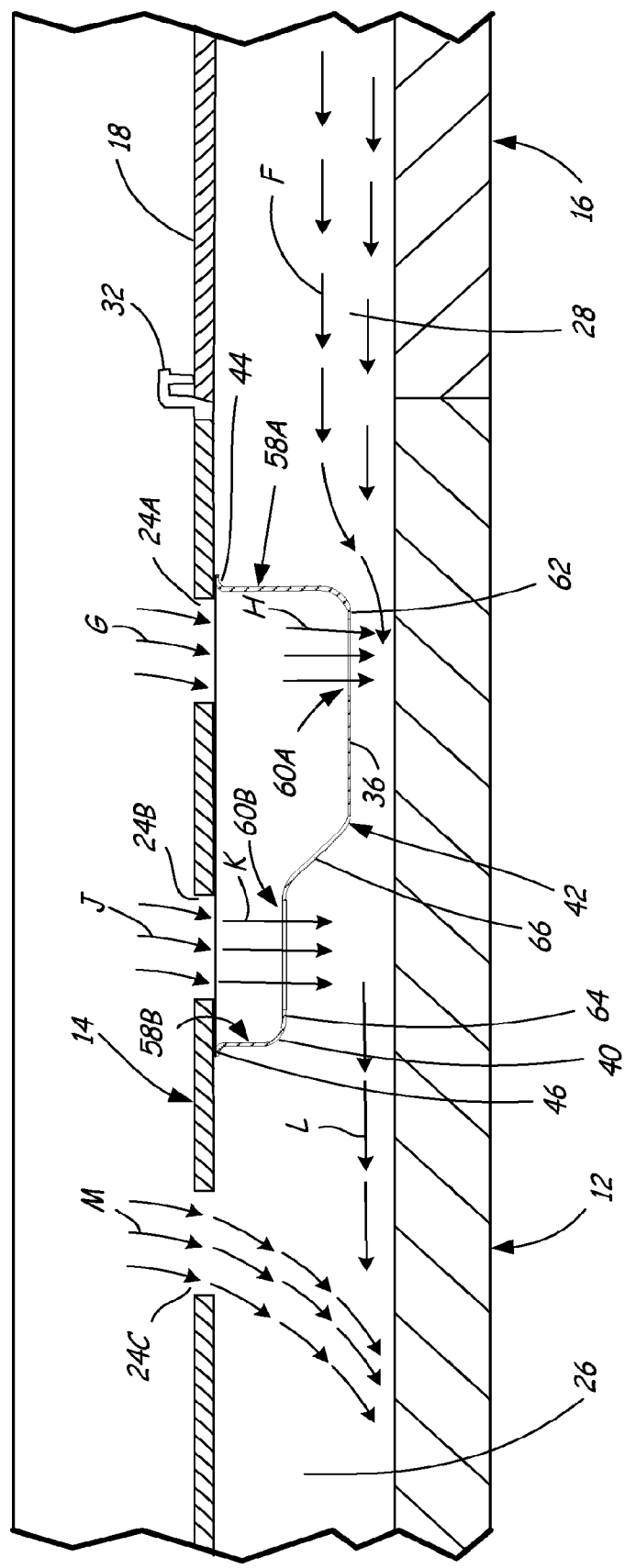
FIG. 3A is a flow diagram illustrating air flow in the combustor assembly of FIG. 1 at one embodiment of a radial flow chamber.

FIG. 3A is a flow diagram illustrating air flow through one radial flow chamber 40 in combustor assembly 10. Air flow F from second flow annulus 28 flows into first flow annulus 26, and cooling air flows through cooling holes 24 to impingement cool combustor liner 12. As shown, cooling air jet G enters radial flow chamber 40 through cooling hole 24A and exits radial flow chamber 40 as cooling air jet H through flow hole 60A. Cooling air jet H impinges on combustor liner 12. Similarly, cooling air jet J enters through cooling hole 24B and exits as cooling air jet K through flow hole 60B to impingement cool combustor liner 12.

End wall 58A prevents air flow F from second flow annulus 28 from entering radial flow chamber 40. Air flow F is deflected downward so that it flows between inner ring 42 and combustor liner 12. Radial flow chambers 40 improve the effectiveness of impingement cooling by cooling holes 24.

Figure 3B:
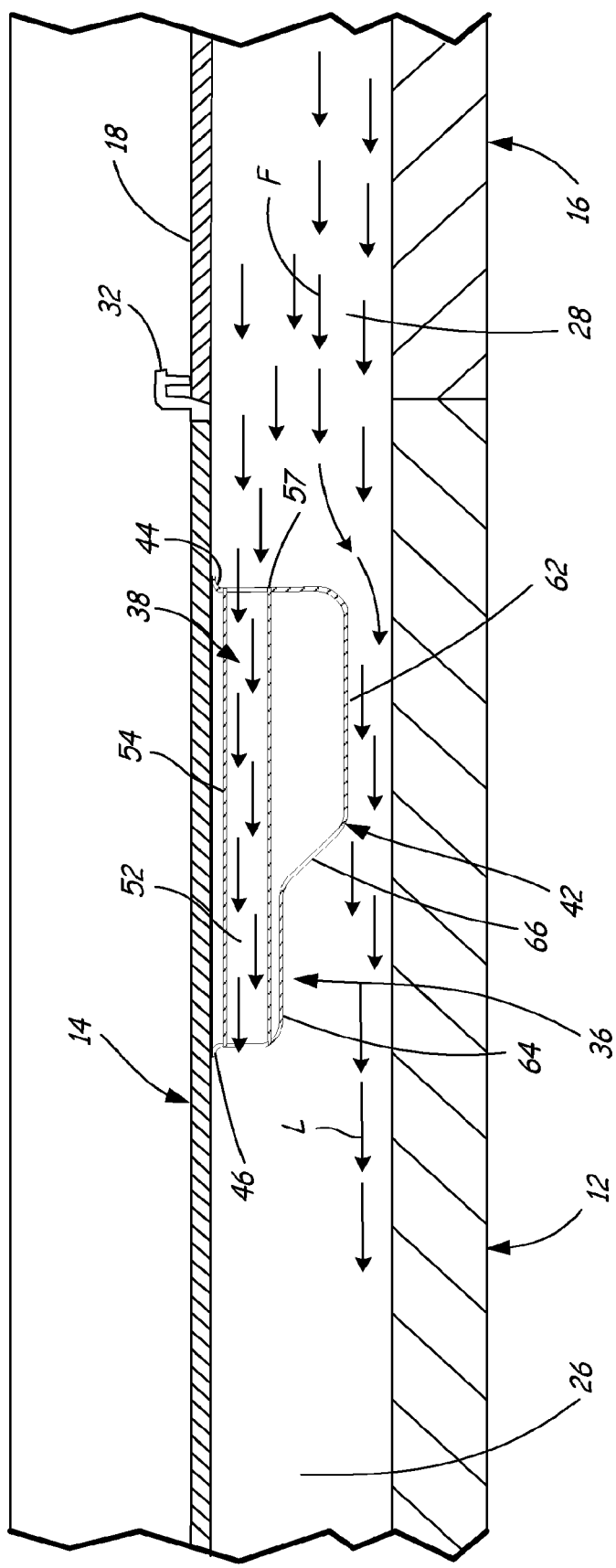
FIG. 3B is a flow diagram illustrating air flow in the combustor assembly of FIG. 1 at one embodiment of a bypass tube.

FIG. 3B is a flow diagram illustrating air flow through one bypass tube in combustor assembly 10. As shown, cooling air flow F from second flow annulus 28 flows parallel to combustor liner 12. A portion of air flow F flows axially through bypass channel 52, in a direction generally parallel to combustor liner 12. The remainder of air flow F is deflected downward so that it flows between inner ring 42 and combustor liner 12. Bypass tubes 38 minimize the blockage of cross flow F and prevent a pressure drop in annulus 26 and annulus 28.

Figure 4A:
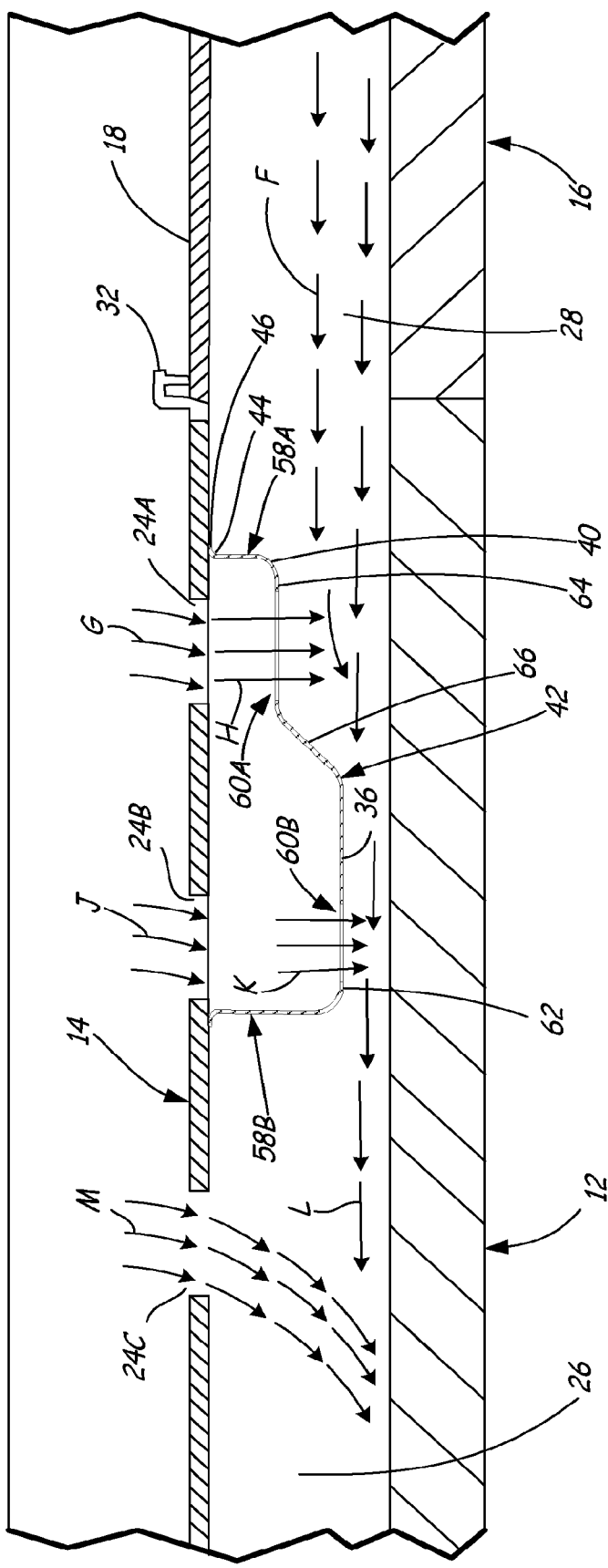
FIG. 4A is a flow diagram illustrating air flow in the combustor assembly of FIG. 1 at another embodiment of a radial flow chamber.
Figure 4B:
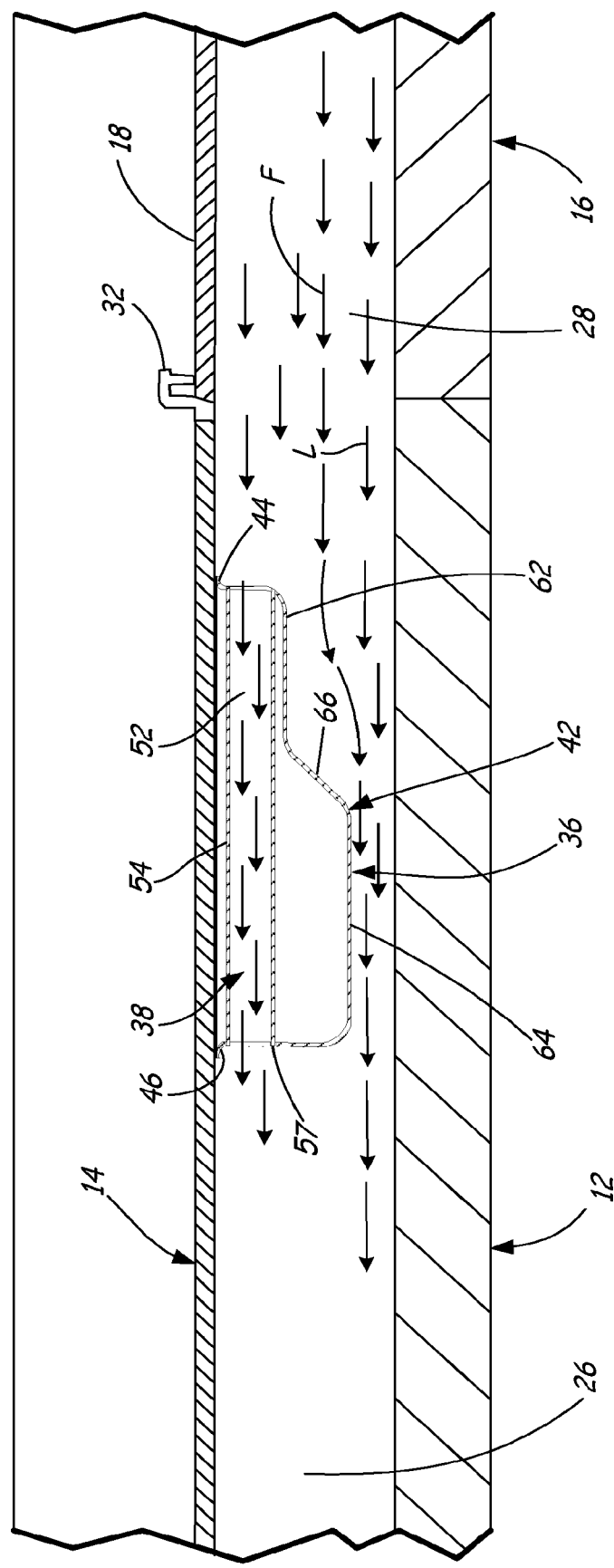
FIG. 4B is a flow diagram illustrating air flow in the combustor assembly of FIG. 1 at another embodiment of a bypass tube.

FIGS. 4A and 4B are flow diagrams illustrating air flow through alternative embodiments of radial flow chamber 40 and bypass tube 38, respectively. FIG. 4A shows radial flow chamber 40 in which the distance between downstream section 64 and combustor liner 12 is less than the distance between upstream section 62 and combustor liner 12. Similarly, FIG. 4B shows plenum ring 36 in which the distance between downstream section 64 and combustor liner 12 is less than the distance between upstream section 62 and combustor liner 12. The flow of air through second flow annulus 28, first flow annulus 26, radial flow chamber 40 and bypass tubes 28 is as described with reference to FIGS. 3A and 3B, the only exception being that air flow F is directed to combustor liner 12 more gradually due to the shallower depth of upstream section 62.

Plenum ring 36 improves the effectiveness and efficiency of cooling holes 24 while allowing air flow from second flow annulus 28 to flow into first flow annulus 26 through bypass tubes 38. Plenum ring 36 may be added to a new or existing combustor assembly to provide a more efficient cooling of combustor liner 12. Plenum ring 36 is a one-piece assembly. In contrast, some prior art assemblies inserted a plurality of individual tubes or conduits into cooling holes 24. In one prior art assembly as many as forty eight (48) individual tubes were welding into cooling holes 24. This is expensive and labor intensive. The large number of pieces also increases the probability that a piece will come loose and cause damage to downstream equipment such as turbine blades and vanes. This is known as foreign object damage (FOD). Plenum ring 36 reduces part count, decreases cost and reduces FOD potential.

Although the present invention has been described with reference to preferred embodiments, workers skilled in the art will recognize that changes may be made in form and detail without departing from the spirit and scope of the invention.

The invention claimed is:

1. A combustor assembly for a turbine engine, the combustor assembly comprising:
   a combustor liner;
   a flow sleeve surrounding the combustor liner;
   a first annulus defined radially between the combustor liner and the flow sleeve;
   a plurality of rows of cooling holes formed in the flow sleeve;
   a plenum ring radially surrounding the combustor liner in the first annulus, the plenum ring comprising a plurality of axial flow passages for directing axial air flow and a plurality of radial flow passages for directing radial air flow;
   a transition duct connected to the combustor liner;
   an impingement sleeve connected to the flow sleeve and radially surrounding the transition duct; and
   a second flow annulus defined radially between the transition duct and the impingement sleeve, wherein the plenum ring is positioned in the first flow annulus adjacent to the transition duct so that the axial flow passages direct air from the second flow annulus to the first flow annulus, and the radial flow passages direct radial air onto the combustor liner.

2. The combustor assembly of claim 1, wherein the plenum ring has an inner ring, the inner ring having an upstream portion adjacent to the impingement sleeve and a downstream portion opposite the upstream portion, and wherein a distance between the downstream portion and the combustor liner is less than a distance between the upstream portion and the combustor liner.

3. The combustor assembly of claim 1, and further comprising a first flow hole formed in each radial flow passage, wherein the first flow holes are aligned with a first row of cooling holes in the flow sleeve.

4. The combustor assembly of claim 3, wherein the first flow hole has a smaller diameter than the cooling hole with which it is aligned.

5. The combustor assembly of claim 3, and further comprising a second flow hole formed in each radial flow passage, wherein the second flow holes are aligned with a second row of cooling holes in the flow sleeve.

6. The combustor assembly of claim 1, and further comprising axial flow blockers attached to each radial flow passage so that axial air cannot enter radial flow passages.

7. The combustor assembly of claim 1, wherein the first row of cooling holes is immediately adjacent to the impingement sleeve.

8. The combustor assembly of claim 7, wherein the first flow hole has a smaller diameter than the second flow hole.

9. The combustor assembly of claim 8, wherein the first hole is closer to the combustor liner than the second flow hole.

10. The combustor assembly of claim 1, wherein the first flow hole is closer to the combustor liner than the second flow hole.

11. The combustor assembly of claim 1, wherein the plenum ring further comprises:
    an upstream flange and a downstream flange axially spaced apart; and
    a first flow hole formed in each radial passage so that air radially flows through each radial passage,
    wherein the plurality of axial passages axially extend between the upstream flange and the downstream flange, each axial passage having an axial bypass channel so that air flows through the bypass channel in an axial direction, and wherein the plurality of radial passages axially extend between the upstream flange and the downstream flange, each radial passage having an upstream section with a first depth and a downstream section with a second depth different from the first depth.

12. The combustor assembly of claim 11, wherein the plenum ring further comprises a second flow hole formed in each radial passage.

13. The combustor assembly of claim 12, wherein the first flow hole has a larger diameter than the second flow hole.

14. The combustor assembly of claim 12, wherein the first depth is deeper than the second depth, and wherein the first flow hole is formed in the upstream section and the second flow hole is formed in the downstream section.

15. The combustor assembly of claim 1, wherein the plenum ring has an inner ring, the inner ring having an upstream portion adjacent to the impingement sleeve and a downstream portion opposite the upstream portion, and wherein a distance between the downstream portion and the combustor liner is greater than a distance between the upstream portion and the combustor liner.

16. A method of cooling a combustor liner, the method comprising:
    surrounding a combustor liner with the flow sleeve, so that a first flow annulus is formed therebetween, wherein the flow sleeve includes a first row of cooling holes and a second row of cooling holes;
    radially surrounding the combustor liner with a plenum ring having a plurality of axial flow passages and a plurality of radial flow passages, wherein each radial flow passage comprises:
        a first flow hole aligned with the first row of cooling holes so that air flows into the first flow annulus and impinges on the combustor liner; and
        a second flow hole aligned with the second row of cooling holes so that air radially flows through the radial flow passage and impinges upon the combustor liner;
    directing axial air flow through the axial flow passages; and
    directing radial air flow through the radial flow passages.

17. The method of claim 16, and further comprising:
    locating an axial flow blocker at each radial flow passage so that axial air flow cannot enter the radial flow passage.

18. The method of claim 16, wherein the first flow holes are closer to the combustor liner than the second flow holes.

19. The method of claim 16, wherein first flow holes have a smaller diameter than the second flow holes.

* * * * *